United States Patent [19]  [11] 3,898,136
Yonemitsu et al.  [45] Aug. 5, 1975

[54] PROCESS FOR COATING SHAPED RESIN ARTICLES

[75] Inventors: Eiichi Yonemitsu, Kashiwa; Akitoshi Sugio, Tokyo; Yukiya Masuda, Urawa; Toshihiko Kobayashi, Showa; Masaki Fujihara, Tokyo, all of Japan

[73] Assignee: Mitsubushi Gas Chemical Company, Ltd., Tokyo, Japan

[22] Filed: Mar. 15, 1974

[21] Appl. No.: 451,600

[30] Foreign Application Priority Data
Mar. 19, 1973 Japan.............................. 48-30870

[52] U.S. Cl................. 204/30; 204/20; 204/38 E; 204/38 B; 117/47 A; 117/71 R; 117/138.8 R; 117/160 R
[51] Int. Cl.$^2$.......................................... C25D 5/56
[58] Field of Search ................. 204/30, 38 B, 38 E; 117/47 A

[56] References Cited
UNITED STATES PATENTS
3,425,946  2/1969  Emons et al...................... 252/79.1
3,660,293  5/1972  Maguire et al..................... 252/79.4
3,671,289  6/1972  Maguire et al..................... 117/47 A
3,790,400  2/1974  Kuzmik............................. 117/47 A
3,808,028  4/1974  Lando............................... 117/47 A
3,817,774  6/1974  Kuzmik............................. 117/47 A Primary Examiner—John H. Mack
Assistant Examiner—Aaron Weisstuch
Attorney, Agent, or Firm—Waters, Schwartz & Nissen

[57] ABSTRACT

A process is disclosed for coating the surface of a shaped article of epoxy resin or polyphenylene oxide resin with a metal by treating the surface of the article with a compound having the formula $RO(AO)_nR'$ wherein one of R and R' is an alkyl or acyl group having not more than four carbon atoms and the other of R and R' is hydrogen atom or an alkyl or acyl group having not more than four carbon atoms, A is a straight or branched $C_2$ to $C_4$ alkylene group, and n is an integer from 1 to 4, further treating the surface with a conventional chemical etchant, and thereafter coating the treated surface of the shaped article with metal. The process provides a strongly adhering metal coating.

9 Claims, No Drawings

PROCESS FOR COATING SHAPED RESIN ARTICLES

This invention relates to a novel process of pretreatment to provide shaped articles of epoxy or polyphenylene oxide resins with metallic films of excellent adhesive property.

Epoxy and polyphenylene oxide resins are known to have excellent electrical and mechanical properties. It has been a desideratum, therefore, in many industrial fields, to form metallic films on the surfaces of shaped articles of these resins, said metallic films being claimed to have a strong adhesion to said surfaces.

As a typical example of processes for coating shaped articles of resins with metals, there is a process in which the articles are coated on the surface with metals by evaporation of said metals or electroless plating with said metals, and if necessary, the shaped articles thus coated are subjected further to electro-plating, thereby increasing the thickness of the resulting metallic films. According to these processes, however, it is impossible to attain a strong adhesion between the shaped article and the metallic film formed thereon.

There have been proposed processes to attain a strong adhesion between shaped articles of resins and metallic films formed thereon, wherein inorganic or organic additives are incorporated into the shaped articles of resins or said articles are coated on the surface, with adhesives onto which the metallic films are formed, with adhesives. These processes, however, are not always satisfactory from the practical point of view because of high cost of the treatment required therefor and because the application of such treatment in most cases results in deterioration of physical properties of the resins.

To attain strong adhesion, furthermore, in the case of shaped articles of ABS resin and the like, for example, the surfaces of the articles are initially roughened by etching with a chromic acid-sulfuric acid mixture and, thereafter, the articles are coated on the roughened surfaces in the usual way with metals. Certainly, strong adhesion can be attained in the case of ABS resin. In the case of epoxy or polyphenylene oxide resin, however, it is impossible to attain the strong adhesion in a manner similar to the case of ABS resin. That is, the metallic film thus obtained on the shaped article easily peels off from the surface of said article even when a small force is applied thereto and, in some cases, said metallic film, when subjected to electro-plating, peels off and falls into the electro-plating bath.

As stated hereinabove, it has been practically impossible to form on the surface of a shaped article of epoxy or polyphenylene oxide resin a metallic film having a strong adhesion without deteriorating the physical properties of the resin.

Under the circumstances, the inventors made extensive studies to overcome the drawbacks associated with the prior art processes for the coating of metals and have eventually accomplished the present invention on the basis of their finding that by applying a certain specific pretreatment to a shaped article of epoxy or polyphenylene oxide resin, a metallic film having a strong adhesion can be obtained on the surface of said shaped article without deteriorating the physical properties of said resin.

The present invention relates to a process for metal coating the surface of a shaped article of epoxy resin or polyphenylene oxide resin, characterized by initially treating said shaped article with a compound represented by the general formula RO(AO)nR', in which one of R and R' is an alkyl or acyl group having not more than 4 carbon atoms and the remaining one is hydrogen atom or an alkyl or acyl group having not more than 4 carbon atoms; A is a straight or branched $C_2$ to $C_4$-alkylene group; and n is an integer of 1 to 4, further treating the thus treated shaped article according to an ordinary procedure with a chemical etchant and, thereafter, coating the thus treated shaped article with the metal.

Usable as epoxy resins in the present invention are high molecular weight compounds having in the molecule two or more epoxy groups and those resulting from the ring-opening reaction of said former high molecular weight compounds. Such epoxy resins may be used singly or in combination with up to 50 percent of any other compatible resin, e.g., polyimide, polyamide-imide, polycyanate, polyisocyanate, alkyd or phenol resin.

The shaped articles of epoxy resin used in the present invention are obtained by subjecting the resin to any of the usual molding processes, such as compression, injection, casting, extrusion and lamination. In practicing the lamination molding of the resin, a large variety of substrates such as paper, glass fiber, synthetic fiber and the like may be used.

Polyphenylene oxide resins usable in the present invention include not only polyphenylene oxide alone but also modified polyphenylene oxide resins. The modified polyphenylene oxide resins are preferably those which contain at least 25 wt percent or more of polyphenylene oxide. The polyphenylene oxide referred to herein is a polymer having at least 50 recurring units, said polymer being obtained according to a known method by polymerization of 2,6-dialkyl substituted phenol. The alkyl group in 2,6-dialkyl substituted phenol is preferably a lower alkyl, and 2,6-dialkyl substituted phenol includes, for example, 2,6-dimethylphenol, 2,6-diethylphenol, 2-methyl-6-ethylphenol and the like. Other resin components which may be contained in the modified polyphenylene oxide resin used in the present invention include such thermoplastic resins as those having properties making them freely compatible with polyphenylene oxide, for example, polycarbonates, polyamides, ABS, impact resisting styrene, AS, and other vinyl type polymers. As the other resin components in the modified polyphenylene oxide resin, there may be used one or two or more of the resins mentioned above. A combination of polyphenylene oxide and an aromatic vinyl polymer is frequently used as the modified polyphenylene oxide resin. The shaped articles of the polyphenylene oxide resin used in the present invention are obtained by subjecting the resin to a molding operation such as compression, injection, extrusion, lamination and the like.

The compound used in the pretreatment in accordance with the present invention includes those represented by the aforesaid general formula RO(AO)nR'. In the general formula, A is a straight or branched chain $C_2$ to $C_4$-alkylene group. Typically it includes, for example, such groups as ethylene, propylene, butylene, amylene and hexylene, and the polymethylene groups e.g., trimethylene or tetramethylene. The alkylene groups are those of 4 or less carbons. n is preferably an integer of 2 or less. One of R and R' is an alkyl or acyl group of not more than 4 carbon atoms, whereas the remaining one of said R and R' is a hydrogen atom or an alkyl or acyl group of not more than 4 carbon atoms. The alkyl group includes such groups, for example, as methyl, ethyl, propyl and butyl, and the acyl group includes such groups, for example, as acetyl, propionyl and butyryl. Both the alkyl and acyl groups should be those of 4 or less carbon atoms. Examples of the compound used in the pretreatment in accordance with the present invention include ethylene glycol monomethyl ether, ethylene glycol dimethyl ether, ethylene glycol ethyl ether, ethylene glycol propyl ether, propylene glycol monomethyl ether, propylene glycol dimethyl ether, trimethylene glycol methyl ether, ethylene glycol acetyl ester, ethylene glycol monoacetylmonomethyl ether, diethylene glycol methyl ether and the like. It should be construed, however, that the compound is not limited only to those exemplified above. The compounds may be used either alone or in combination of two or more of them, and may also be used in the form of an aqueous solution. When the compounds are used in the form of an aqueous solution, the concentration of said compound in the solution is preferably 70 percent by volume or more.

In the present invention, the pretreatment is effected by immersing a shaped article of epoxy or polyphenylene oxide resin in a treating liquid which is the aforesaid compound per se or its aqueous solution, or contacting the shaped article with vapor of said compound, or spraying the aforesaid treating liquid upon said article.

The temperature and time for the pretreatment employed in the present invention are not particularly restricted, but are suitably decided after taking into consideration the kind of the treating liquid and other conditions. Usually, however, the treatment temperature is a temperature of from 20°C. to the boiling point of a treating liquid used, and preferably 20°–60°C. The time required is 3–120 minutes, and usually is within 30 to 60 minutes. When the pretreatment is effected to an insufficient extent, the surface of shaped article is not satisfactorily roughened, whereby the peeling strength of the resulting metallic film becomes small, and conversely, if the pretreatment is excessively effected, the surface of shaped article becomes excessively rough, whereby the finished surface of the resulting metallic film becomes poor.

After the pretreatment, the surface of shaped article, following water washing, is roughened according to the usual method by etching treatment with a chemical etchant. As the chemical etchant, there may ordinarily be used an oxidizing solution containing chromic acid and sulfuric acid, nitric acid or phosphoric acid. Treatment with the chemical etchant is usually carried out at a temperature ranging from ambient temperature to 100°C. for 3 to 120 minutes (usually 30 to 60 minutes). After water washing, a metal such as gold, silver, copper, nickel, tin, chromium, cobalt, lead, zinc or platinum is vacuum evaporated onto the surface of the shaped article roughened according to the aforesaid treatment. An alloy such as lead-tin (solder) or nickel-cobalt also is usable. Alternatively, after sensitizing by use of an aqueous tin chloride solution and the like, the sensitized surface of the shaped article is activated by means of palladium chloride and the like and then immersed into an electroless plating solution to coat the shaped article on the surface with a metal, whereby a metallic film having a strong adhesion can be obtained on the surface of the shaped article. Furthermore, a metallic film can also be obtained on the surface of the shaped article according to other methods such as cathode sputtering or melt-jetting of the metal. The shaped article of resin thus coated with a metal is subjected further, if necessary, to electro-plating, thereby increasing the resulting metallic film in its thickness. Commercially most important metallic films are those from copper, nickel, gold, silver and nickel-cobalt.

In accordance with the present invention, there is provided a metallic film having a peel strength of 1.0–3.0 kg/cm on the surface of shaped article of epoxy or polyphenylene oxide resin, whereas there have heretofore been obtained on such shaped articles only metallic films having very low peel strength. Measurement of the peel strength as above and as referred to in the following examples was carried out according to the JIS method C-6481 (1963).

EXAMPLE 1

A glass-epoxy resin board (a product produced and sold by Mitsubishi Gas Kagaku K.K.; trade name GEP 130 SS; size 100 mm × 100 mm × 1.6 mm) was thoroughly washed with a neutral detergent, followed by washing with water. The board was then immersed into ethylene glycol monomethyl ether at 20°C. for 60 minutes. After washing with water, the board was treated with a chromic acid solution ($CrO_3$ 60g, 98 percent $H_2SO_4$ 500 ml, pure water 500 ml) at 40°C. for 30 minutes and then washed with water.

Subsequently, the board was treated with a tin chloride sensitizing solution ($SnCl_2$ 10g, 35 percent HCl 40 ml, pure water 1000 ml) at 20°C. for 30 minutes and then washed with water. The board was further treated with a palladium chloride activation bath ($PdCl_2$ 0.3 g, 35 percent HCl 15 ml, pure water 1000 ml) at 20°C. for 1 minute. followed by water washing. The board was then immersed in an electroless copper plating bath ($CuSO_4 \cdot 5H_2O$ 29 g/l, 37 percent HCHO 160 ml/l, NaOH 41 g/l, $(NH_2)_2CS$ 0.001 g/l) at 20°C. for 10 minutes to coat the resin board with copper. The copper-coated board was further subjected to electro-plating in a copper sulfate plating bath ($CuSO_4$ 210 g/l, $H_2SO_4$ 60 g/l, HCl 0.012 g/l, dextrine 0.01 g/l, urea 0.01 g/l) under the conditions of 7 Amperes and 40 minutes to form thereon a metallic film of 30$\mu$ in thickness. Thereafter, the board having the metallic film thereon was washed with water and dried at 150°C. for 1 hour. The metallic film was measured for its adhesion to and showed a peel strength of 1.8 kg/cm.

EXAMPLE 2

Following the same manner as in Example 1, a glass-epoxy resin board was treated with ethylene glycol monomethyl ether and then with a chromic acid solution, washed with water and then dried. Subsequently, gold was vacuum evaporated onto the board to form thereon a metallic film. Thereafter, the gold deposited board was subjected to electro-plating (7 A, 40 minutes) to obtain thereon a metallic film of 30$\mu$ in thickness. The resultant board was then washed with water and then dried at 150°C. for 1 hour. The metallic film was measured for its adhesion and had a peel strength of 1.5 kg/cm.

EXAMPLE 3

The same procedures as in Example 1 were repeated, except that a glass-epoxy resin board was treated at 60°C. for 5 minutes with an aqueous 80 percent ethylene glycol monomethyl ether solution in place of the ethylene glycol monomethyl ether, whereby a metallic film of 30µ in thickness was obtained on the board. Peel strength of the metallic film thus obtained was 2.5 kg/cm.

EXAMPLE 4

Example 2 was repeated, except that the glass-epoxy resin board was treated at 60°C. for 30 minutes with ethylene glycol propyl ether in place of the ethylene glycol monomethyl ether, whereby a metallic film of 30µ in thickness was obtained. The metallic film thus obtained had a peel strength of 1.3 kg/cm.

EXAMPLE 5

Example 1 was repeated, except that the glass-epoxy resin board was treated at 60°C. for 60 minutes with ethyl cellosolve acetate ($CH_3COOCH_2CH_2OC_2H_5$) in place of the ethylene glycol monomethyl ether, whereby a metallic film of 30µ in thickness was obtained on the board. The metallic film thus obtained had a peel strength of 1.2 kg/cm.

EXAMPLE 6

Example 1 was repeated, except that the glass-epoxy resin board was subjected to spraying through a spray nozzle at 40°C. for 15 minutes with propylene glycol monomethyl ether in place of immersing said board in the ethylene glycol monomethyl ether, whereby a metallic film of 30µ in thickness was obtained on the board. The metallic film thus obtained had a peel strength of 1.3 kg/cm.

EXAMPLE 7

Example 6 was repeated, except that the glass-epoxy resin board was subjected to spraying at 40°C. for 5 minutes with an aqueous 50 percent ethylene glycol dimethyl ether in place of the propylene glycol monomethyl ether, whereby a metallic film of 30µ in thickness was obtained on the board. The metallic board thus obtained had a peel strength of 1.5 kg/cm.

EXAMPLE 8

Example 1 was repeated, except that the glass-epoxy resin board was treated for 1 minute with the vapor (83°C.) of ethylene glycol dimethyl ether in place of immersing said board in the ethylene glycol monomethyl ether, whereby a metallic film of 30µ in thickness was obtained on the board. The metallic film thus obtained had a peel strength of 2.1 kg/cm.

EXAMPLE 9

Example 1 was repeated, except that a modified polyphenylene oxide resin board (size 100 mm × 100 mm × 1.6 mm; an injection molded product obtained from a mixture of 50 wt percent of poly-2,6-dimethyl-1,4-phenylene oxide and 50 wt percent of an impact resisting polystyrene) was used in place of the glass-epoxy resin board, whereby a metallic film of 30µ in thickness was obtained on the board. The metallic film thus obtained had a peel strength of 1.5 kg/cm.

EXAMPLE 10

Example 9 was repeated, except that a poly-2,6-dimethyl-1,4-phenylene oxide resin board (size 100 mm × 100 mm × 1.6 mm) was used in place of the modified polyphenylene oxide resin board, whereby a metallic film of 30µ in thickness was obtained on the board. The metallic film thus obtained had a peel strength of 1.0 kg/cm.

EXAMPLE 11

Example 9 was repeated, except that a modified polyphenylene oxide resin board (size 100 mm × 100 mm × 1.6 mm; an injection molded product obtained from a mixture of 25 wt percent of poly-2,6-dimethyl-1,4-phenylene oxide, 75 wt percent of an impact resisting polystyrene and a heat stabilizer) used in place of the modified polyphenylene oxide resin board used in Example 9 was immersed at 20°C. for 50 minutes in ethylene glycol monomethyl ether, whereby a metallic film of 30µ in thickness was obtained on the board. The metallic film thus obtained had a peel strength of 1.7 kg/cm.

COMPARATIVE EXAMPLE 1

A glass-epoxy resin board was treated in the same manner as in Example 1, except that the board was not treated with the ethylene glycol monomethyl ether, whereby a metallic film of 30µ in thickness was obtained on the board. The metallic film thus obtained had a peel strength of less than 0.1 kg/cm.

COMPARATIVE EXAMPLE 2

A glass-epoxy resin board was treated in the same manner as in Example 2, except that the board was not treated with the ethylene glycol monomethyl ether, whereby a metallic film of 30µ in thickness was obtained on the board. The metallic film thus obtained had a peel strength of less than 0.1 kg/cm.

COMPARATIVE EXAMPLE 3

The same modified polyphenylene oxide resin board as in Example 9 was treated in the same manner as in Example 9, except that the board was not treated with the ethylene glycol monomethyl ether whereby a metallic film of 30µ in thickness was obtained on the board. The metallic film thus obtained had a peel strength of less than 0.1 kg/cm.

What we claim is:

1. A process for coating the surface of a shaped article of epoxy resin or polyphenylene oxide resin with a metal, which comprises treating said surface with a compound of the formula RO $(AO)_n$R' wherein one of R and R' represents an alkyl or acyl group with not more than 4 carbon atoms and the remaining one of said R and R' is hydrogen or an alkyl or acyl group with not more than 4 carbon atoms, A is a straight or branched chain $C_2$ to $C_4$-alkylene group, and n is an integer of 1 to 4; further treating the above treated surface with a chemical etchant; and then applying thereto a metal coating.

2. A process as claimed in claim 1, wherein said metal is one member selected from the group consisting of gold, silver, copper, nickel, tin, chromium, cobalt, lead, zinc, platinum, lead-tin and nickel-cobalt.

3. A process as claimed in claim 1, wherein said chemical etchant is one member selected from the group consisting of chromic acid-sulfuric acid, chromic acid-nitric acid and chromic acid-phosphoric acid.

4. A process as claimed in claim 1, wherein the application of said metal coating is effected by vacuum evaporation or electroless plating, followed by electroplating.

5. A process as claimed in claim 1, wherein the compound for the pretreatment is used as such or in aqueous solution at a concentration of at least 70 percent by volume.

6. A process as claimed in claim 1, wherein said epoxy resin is a thermosetting epoxy resin.

7. A process as claimed in claim 1, wherein said polyphenylene oxide resin is a resin blend of 25 – 80 percent by weight of polyphenylene oxide with 20 – 75 percent by weight of impact resisting polystyrene.

8. A process for coating a shaped article of epoxy resin or polyphenylene oxide resin on its surface with a metal, which comprises treating the surface of said shaped article with a compound of the formula RO(AO)$_n$R' wherein one of R and R' is an alkyl or acyl group with not more than 4 carbon atoms and the remaining one of said R and R' is hydrogen or an alkyl or acyl group with not more than 4 carbon atoms, A is a straight or branched chain $C_2$ to $C_4$-alkylene group and n is an integer of 1 to 2, as such or in aqueous solution at a concentration of not less than 70 percent by volume at a temperature of from 20°C to the boiling point of the treating liquid used; then, after rinsing, treating the above treated surface with a chemical etchant selected from the group consisting of chromic acid-sulfuric acid, chromic acid-nitric acid and chromic acid-phosphoric acid, at a temperature of from ambient temperature up to 100°C. for a sufficient time to roughen said surface; and subsequently applying thereto a metal coating.

9. A process according to claim 8 wherein said treatment with a compound of the formula RO(AO)$_n$R', wherein R, R', A and $n$ are as defined in claim 8, is carried out at a temperature from 20°C to 80°C.

* * * * *